United States Patent
Seo et al.

(10) Patent No.: US 9,496,899 B2
(45) Date of Patent: *Nov. 15, 2016

(54) BANDPASS SAMPLING RECEIVER, AND METHOD FOR DESIGNING AND RECONSTRUCTING A FILTER THEREOF

(75) Inventors: Seok Seo, Daejeon (KR); Jin Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/824,802

(22) PCT Filed: Sep. 20, 2011

(86) PCT No.: PCT/KR2011/006933
§ 371 (c)(1),
(2), (4) Date: Mar. 19, 2013

(87) PCT Pub. No.: WO2012/039575
PCT Pub. Date: Mar. 29, 2012

(65) Prior Publication Data

US 2013/0177107 A1 Jul. 11, 2013

(30) Foreign Application Priority Data

Sep. 20, 2010 (KR) .......... 10-2010-0092527
Jun. 30, 2011 (KR) .......... 10-2011-0064979

(51) Int. Cl.
*H04L 27/06* (2006.01)
*H04B 1/00* (2006.01)

(52) U.S. Cl.
CPC ......... *H04B 1/0042* (2013.01); *H04B 1/001* (2013.01); *H04B 1/0014* (2013.01)

(58) Field of Classification Search
CPC ... H04B 1/0042; H04B 1/001; H04B 1/0014

USPC .......................................................... 375/340
See application file for complete search history.

(56) References Cited

U.S. PATENT DOCUMENTS 6,067,329 A * 5/2000 Kato .................. H04L 27/06
329/304
8,331,494 B1 * 12/2012 Yu ...................... H03H 17/0664
329/345

(Continued)

FOREIGN PATENT DOCUMENTS

EP 2434651 A1 3/2012
JP 11-261433 9/1999

(Continued)

OTHER PUBLICATIONS

Kim, Jae-Hyung et al., "Bandpass Sampling Digital Frontend Architecture for Multi-band Access Cognitive Radio," Global Telecommunications Conference, pp. 1-6 (2009).

(Continued)

*Primary Examiner* — Erin File
(74) *Attorney, Agent, or Firm* — Nelson Mullins Riley & Scarborough LLP; Anthony A. Laurentano

(57) ABSTRACT

Provided are a bandpass sampling receiver and a filter design and reconfiguration method thereof. The bandpass sampling receiver includes: an analog-digital converter converting an analog wireless signal into a digital baseband signal; and a complex baseband signal extraction unit generating a first path signal and a second path signal from the digital baseband signal and extracting a complex baseband signal using a relative sample delay difference between the first and second path signals, wherein the first path signal is a down sampled signal after the digital baseband signal is sample-delayed and the second path signal is a down sampled signal without sample-delaying the digital baseband signal.

13 Claims, 17 Drawing Sheets

(56) References Cited

U.S. PATENT DOCUMENTS

| | | | |
|---|---|---|---|
| 2001/0050966 A1 | 12/2001 | Signell et al. | |
| 2002/0181614 A1 | 12/2002 | Mostafa et al. | |
| 2004/0004995 A1* | 1/2004 | Boesel | H04B 1/712 375/130 |
| 2004/0052306 A1* | 3/2004 | Ibrahim | H04L 25/0232 375/152 |
| 2006/0233392 A1 | 10/2006 | Koyanagi | |
| 2007/0060077 A1 | 3/2007 | Qian | |
| 2007/0081617 A1 | 4/2007 | Fudge | |
| 2007/0140382 A1 | 6/2007 | Qian | |
| 2007/0142005 A1* | 6/2007 | Sundstrom | H03C 5/00 455/126 |
| 2007/0156800 A1* | 7/2007 | Sturza | H03H 17/0277 708/300 |
| 2007/0230612 A1* | 10/2007 | Ahmed | H03C 5/00 375/295 |
| 2009/0191861 A1* | 7/2009 | Maruta | H04B 1/7087 455/424 |
| 2010/0156690 A1 | 6/2010 | Kim et al. | |
| 2010/0208847 A1* | 8/2010 | Reial | H04J 11/0063 375/340 |
| 2012/0155666 A1* | 6/2012 | Nair | G10K 11/178 381/71.6 |
| 2012/0155667 A1* | 6/2012 | Nair | G10K 11/178 381/71.6 |
| 2014/0140195 A1* | 5/2014 | Kusunoki | H04L 5/0078 370/210 |

FOREIGN PATENT DOCUMENTS

| | | |
|---|---|---|
| KR | 10-0373299 | 2/2003 |
| KR | 10-2006-0110270 | 10/2006 |
| KR | 10-2006-0116828 | 11/2006 |
| KR | 10-2006-0121126 | 11/2006 |
| KR | 10-0735326 | 7/2007 |
| KR | 10-0795315 | 1/2008 |
| KR | 10-2010-0072474 | 7/2010 |
| WO | 2009/158176 A1 | 12/2009 |

OTHER PUBLICATIONS

International Search Report for Application No. PCT/KR2011/006933, 4 pages, dated Feb. 28, 2012.

* cited by examiner

BANDPASS SAMPLING RECEIVER, AND METHOD FOR DESIGNING AND RECONSTRUCTING A FILTER THEREOF

RELATED APPLICATIONS

This application is a 35 U.S.C. §371 filing of International Application Number PCT/KR2011/006933 which was filed on 20 Sep. 2011 and which claims priority to, and the benefit of, Korean Application Nos.: 10-2010-0092527, filed on 20 Sep. 2010; and 10-2011-0064979 filed 30 Jun. 2011.

TECHNICAL FIELD

The present invention disclosed herein relates to a wireless signal receiver, and more particularly, to a wireless signal receiver using a bandpass sampling technique.

BACKGROUND ART

In addition to a miniaturization trend of a wireless communication system, a demand for the next generation wireless communication receiver with flexibility, adaptability, and cognitivity has been increased. In order to satisfy this demand, Analog-to-Digital Converter (ADC) needs to be placed as close as possible to an antenna and frequency conversion and demodulation functions are performed using a Digital Signal Processor (DSP). As the next generation wireless communication receiver satisfying the above demand, a bandpass sampling receiver receives considerable attentions. The bandpass sampling receiver may provide excellent functions in aspects of reconfiguration and multi-band/multimode reception.

A typical bandpass sampling receiver may receive an analog RF signal through an antenna and the received signal is bandpass-filtered through an analog bandpass filter. The bandpass-filtered analog signal is amplified through a Low Noise Amplifier (LNA) and then is converted into a digital baseband signal through an ADC. Since the bandpass sampling receiver does not require an analog device such as a mixer and a local oscillator, it may provide a flexible, low cost, and small wireless communication receiver. However, the typical bandpass sampling receiver may down-convert a received analog RF signal into a baseband signal of a digital format only when a carrier frequency is integer times of a sample rate in receiving a single RF signal.

Accordingly, when a signal in an arbitrary frequency band is to be received using the typical bandpass sampling receiver, a sample rate needs to be determined in order to prevent aliasing in a baseband after digital conversion. However, it is very complex to determine a sample rate to prevent aliasing and furthermore, there are cases that no solution is found for a sample rate to prevent aliasing. Therefore, the typical bandpass sampling receiver has a limitation in receiving an RF signal in an arbitrary frequency band.

Moreover, a demand for the accommodation of at least two respectively different communication standards signal using a single wireless receiver has been increased recently. Especially, a communication type such as a Software-Defined Radio (SDR) communication system requires a function for receiving an arbitrary frequency band signal. However, a typical receiver should include respectively different receiver circuits or chips according to each mode and each frequency band or channel. Therefore, a circuit structure of the typical receiver becomes complex and its unit cost becomes expensive. As a result, a new type of receiver that supports a multimode using a single receiver circuit is required.

DETAILED DESCRIPTION

Technical Problem

The present invention provides a bandpass sampling receiver having less complex hardware and applicable flexible sample rate.

Technical Solution

The present invention also provides a bandpass sampling receiver receiving all frequency bands and signal bandwidths.

The present invention also provides a bandpass sampling receiver removing aliasing in a baseband using a single analog-digital converter.

The present invention also provides a bandpass sampling receiver preventing a relative delay time error between signal paths.

Embodiments of the present invention provide bandpass sampling receivers including: an analog-digital converter converting an analog wireless signal into a digital baseband signal; and a complex baseband signal extraction unit generating a first path signal and a second path signal from the digital baseband signal and extracting a complex baseband signal using a relative sample delay difference between the first and second path signals, wherein the first path signal is a down sampled signal after the digital baseband signal is sample-delayed and the second path signal is a down sampled signal without sample-delaying the digital baseband signal.

In some embodiments, the complex baseband signal extraction unit may include: a first delay generating the sample-delayed version of the digital baseband signal from the analog-to-digital converter; a first down sampler generating the first path signal by down-sampling a delay result of the first delay; a second down sampler generating the second path signal by down-sampling the digital baseband signal converted in the analog-digital converter; a first digital filter filtering the first path signal; a second digital filter filtering the second path signal; and an adder extracting the complex baseband signal by adding a filtering result of the first digital filter and a filtering result of the second digital filter.

In other embodiments, the adder may include a subtractor extracting the complex baseband signal by subtracting the filtering result of the second digital filter from the filtering result of the first digital filter.

In still other embodiments, a relative time delay difference due to the relative sample delay difference between the first path signal and the second path signal may be determined by at least one of a sampling rate of the analog-digital converter, a delay value of the first delay, and a down sampling rate of the first and second down samplers.

In even other embodiments, digital filter coefficients of each of the first digital filter and the second digital filter may be determined by at least one of a carrier frequency of the analog wireless signal, a frequency band position index of the analog wireless signal, a sampling rate of the analog-digital converter, a sample delay value of the first delay, and a down sampling rate of the first and second down samplers.

In yet other embodiments, at least one value of the sampling rate, the sample delay value D of the first delay, and the down sampling rate N may be changed to satisfy $(2nD)/N \neq m$, where n is a frequency band position index of an analog wireless signal and m is an integer.

In further embodiments, digital filter coefficients of each of the first digital filter and the second digital filter may be recalculated as at least one of a carrier frequency of the analog wireless signal, a frequency band position index of the analog wireless signal, a sampling rate of the analog-digital converter, a sample delay value of the first delay, and a down sampling rate of the first and second down samplers is changed and on the basis of the recalculated digital filter coefficients, each of the first digital filter and the second digital filter is reconfigured.

In still further embodiments, the first digital filter and the second digital filter may be determined to satisfy at least one of $S(f)=S_A^\delta(f)+S_B^\delta(f)=R_+(f)$, $S(f)=S_A^\delta(f)-S_B^\delta(f)=R_+(f)$, $S(f)=S_A^\delta(f)+S_B^\delta(f)=R_-(f)$, and $S(f)=S_A^\delta(f)-S_B^\delta(f)=R_-(f)$, where S(f) represents a spectrum of an output signal of the adder, $S_A^\delta(f)$ represents a spectrum of the first digital filter output signal, $S_B^\delta(f)$ represents a spectrum of the second digital filter output signal, $R_-(f)$ represents a negative frequency spectrum of the digital baseband signal, and $R_+(f)$ represents a positive frequency spectrum of the digital baseband signal.

In even further embodiments, an operating speed of the first digital filter and the second digital filter may be determined according to a sampling rate of the analog-digital converter and a down sampling rate of the first and second down samplers.

In yet further embodiments, the first and second down samplers may include first and second decimators down-converting a sampling rate by decimating the first and second path signals; and each of the first and second decimators includes a pre-filter and a down sampler.

In yet further embodiments, the second digital filter may include a sample delay and a gain adjustment logic.

In yet further embodiments, a connection position of the sample delay and the gain adjustment logic may be interchangeable.

In other embodiments of the present invention, design and reconfiguration methods of a first digital filter and a second digital filter to receive all arbitrary frequency band signals include: setting such parameters as a carrier frequency $f_c$ of an analog wireless signal, a sample rate $f_s$ of an analog-digital converter converting the analog wireless signal into a digital baseband signal, a sample delay value D of a first delay sample-delaying the digital baseband signal, and a down sampling rate N of a first down sampler down-sampling a sample delay result of the first delay and a second down sampler down-sampling the digital baseband signal without sample delay; calculating a frequency band position index n of the analog wireless signal; calculating coefficients of each of the first digital filter and the second digital filter by applying the sample rate $f_s$, the frequency band position index n, the sample delay value D, and the down sampling rate N; and reconfiguring the first digital filter and the second digital filter on the basis of the calculated filter coefficients.

Advantageous Effects

With an embodiment of the inventive concept, the present invention provides a bandpass sampling receiver having less complex hardware and applicable flexible sample rate.

DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

MODE FOR INVENTION

Figure 1:
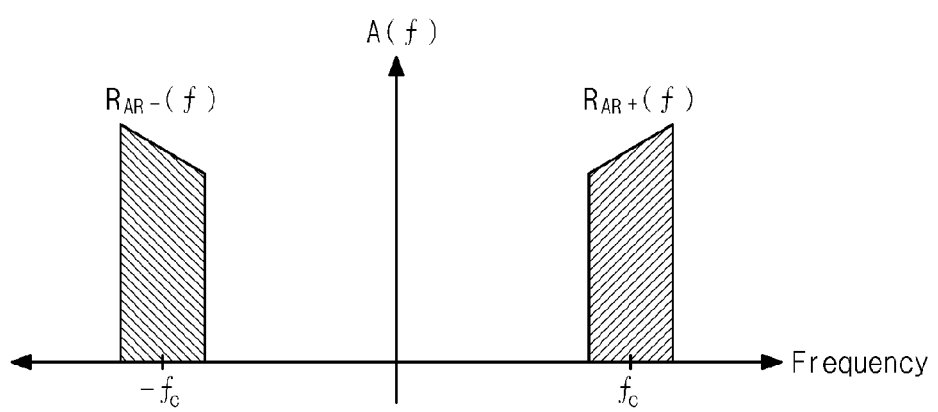
FIG. 1 is a view illustrating a spectrum of an analog RF signal in an arbitrary frequency band.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will completely convey the scope of the present invention to those skilled in the art. Like reference numerals refer to like elements. Embodiments hereafter may have various modifications and the scopes of the present invention are not limited the following embodiments.

FIG. 1 is a view illustrating a spectrum of an analog RF signal in an arbitrary frequency band.

Referring to FIG. 1, it is assumed that an analog RF signal includes a carrier frequency of $f_c$ and a signal bandwidth of B. A spectrum of the analog RF signal includes a positive frequency spectrum component and a negative frequency spectrum component. Moreover, referring to FIG. 1, $R_{AR+}(f)$ represents a positive frequency spectrum component of an analog RF signal and $R_{AR-}(f)$ represents a negative frequency spectrum component of an analog RF signal.

Figure 2:
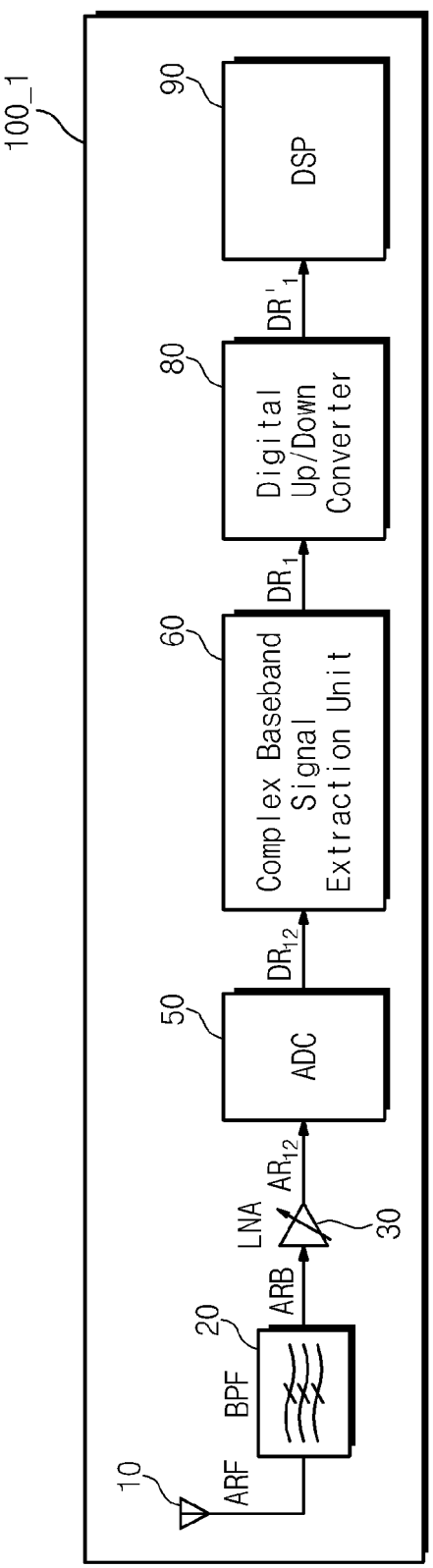
FIGS. 2 and 3 are views illustrating full configurations of bandpass sampling receivers according to an embodiment of the present invention.
Figure 3:
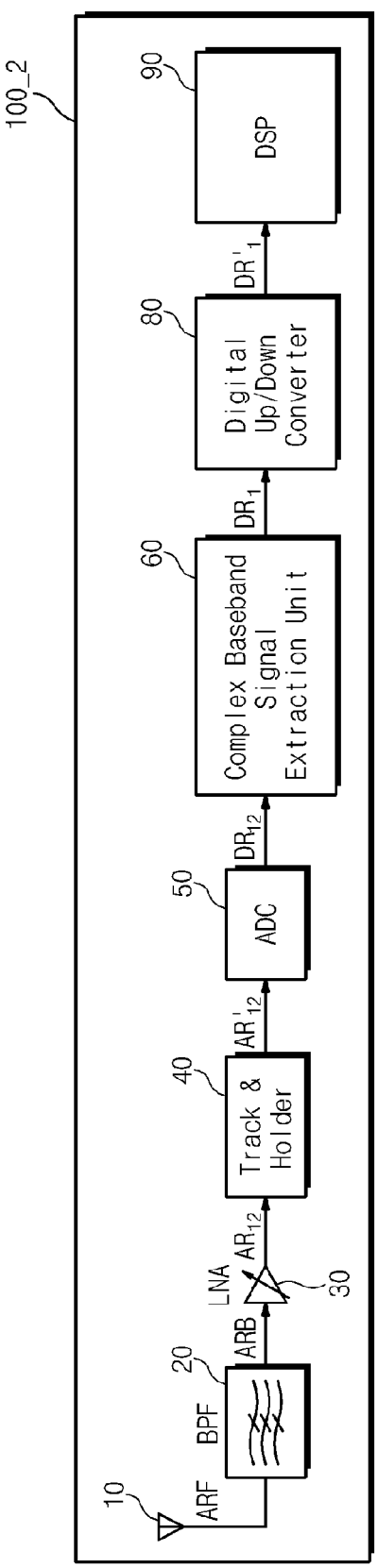

FIGS. 2 and 3 are views illustrating full configurations of bandpass sampling receivers 100_1 and 100_2 according to an embodiment of the present invention.

Referring to FIG. 2, the bandpass sampling receiver 100_1 may include an antenna 10, a BandPass Filter (BPF) 20, a Low Noise Amplifier (LNA) 30, an Analog-Digital Converter (ADC) 50, a complex baseband signal extraction unit 60, a digital up/down converter 80, and a Digital Signal Processor (DSP) 90.

The antenna 10 serves to receive a wirelessly transmitted Analog RF signal (ARF) signal. The BPF 20 may include a wideband bandpass filter filtering a wideband signal. The BPF 20 may be designed with a passband limited to a predetermined bandwidth B and may remove noise of a signal band. In an exemplary embodiment, the passband and pass bandwidth B set in the BPF 20 may have fixed or various values. For this, the BPF 20 may include a tunable BPF.

The LNA 30 amplifies a filtering result ARB of the BPF 20 and generates an amplified analog RF signal $AR_{12}$.

The ADC 50 converts the analog RF signal $AR_{12}$ from the LNA 30 into a digital baseband signal $DR_{12}$. For example, the ADC 50 converts the analog RF signal $AR_{12}$ from the LNA 30 into the digital baseband signal $DR_{12}$ having a sample rate of $f_s$. The spectrum of the digital baseband signal $DR_{12}$ at the output of the ADC 50 includes the sum of a positive spectrum component shifted from a positive frequency band and a negative spectrum component shifted from a negative frequency band.

As shown in FIG. 2, the single ADC 50 may be used in the bandpass sampling receiver 100_1. Moreover, all components of the complex baseband signal extraction unit 60 extracting a complex baseband signal may be configured with all digital circuits. Accordingly, compared to a typical bandpass sampling receiver, hardware complexity becomes less. Here, a detailed configuration of the complex baseband signal extraction unit 60 is not limited to a specific forms and thus may have various changes and modifications. For example, a detailed configuration of the complex baseband signal extraction unit 60 may vary, such as complex baseband signal extraction units 60_1 to 60_6 according to first to sixth embodiments described below.

The complex baseband signal extraction unit 60 generates a first path signal (refer to $DR_A$ of FIG. 4) with a sample delay and a second path signal (refer to $DR_B$ of FIG. 4) from the digital baseband signal $DR_{12}$ converted by the ADC 50. Moreover, a spectrum component shifted from a positive frequency band or a spectrum component shifted from a negative frequency band are extracted through a digital filter designed on the basis of a phase difference due to a relative sample delay difference between the first and second path signals $DR_A$ and $DR_B$.

According to a configuration of the complex baseband signal extraction unit 60, even when a positive frequency spectrum component and a negative frequency spectrum component are aliased in a baseband, a complex baseband signal is extracted completely by removing aliasing influence. That is, even only with the single ADC 50, a positive frequency spectrum component shifted from a positive frequency band and a negative frequency spectrum component shifted from a negative frequency band are extracted completely. Accordingly, compared to a typical bandpass sampling receiver with a specific sample rate, a more flexible sample rate is selected and all frequency bands and signal bandwidths are receptacle.

The center frequency of a complex baseband signal extracted from the complex baseband signal extraction unit 60 is determined by a carrier frequency $f_c$ and a sample rate $f_s$ of an analog RF signal and may be or may not be 0. If the center frequency of a complex baseband signal extracted from the complex baseband signal extraction unit 60 is not 0, it may shift to 0 through the digital up/down converter 80. If the center frequency of a complex baseband signal extracted from the complex baseband signal extraction unit 60 is 0, the digital up/down converter 80 shifting the center frequency of a complex baseband signal into 0 may be configurationally omitted (referring to FIGS. 18 to 20). Baseband signal processing (e.g., a demodulation operation) on the complex baseband signal having the center frequency of 0 is performed through the DSP 90.

Furthermore, a complex baseband signal extracted from the complex baseband signal extraction unit 60 may correspond to a complex baseband signal $DR_1$ having a positive frequency spectrum component shifted from a positive frequency band or a complex baseband signal $DR_1$ having a negative frequency spectrum component shifted from a negative frequency band. For convenience of description, it will be exemplarily described that the complex baseband signal extraction unit 60 removes a negative frequency spectrum component shifted from a negative frequency band and extracts a complex baseband signal $DR_1$ having a positive frequency spectrum component shifted from a positive frequency band. However, this is just one example that the present invention is applied. Also, a configuration of a complex baseband signal extracted by the complex baseband signal extraction unit 60 is not limited to a specific form and may have various changes and modifications.

Referring to FIG. 3, the bandpass sampling receiver 100_2 may further include a track and holder 40 besides the configuration of the bandpass sampling receiver 100_1 shown in FIG. 2. The bandpass sampling receiver 100_2 shown in FIG. 3 may be substantially identical to the bandpass sampling receiver 100_1 except the track and holder 40. Accordingly, like reference numerals refer to like elements and overlapping descriptions will be omitted below.

Although not shown in FIG. 3, the track and holder 40 may include an analog switch and a sampling capacitor. If the analog switch is off, the track and holder 40 may operate in a track mode tracking an input signal. Moreover, if the analog switch is on, the track and holder 40 operates in a hold mode. In the hold mode, the track and holder 40 maintains the last instantaneous value of the input in the sampling capacitor. According to the operations of the track and holder 40 in the track mode and the hold mode, an analog-digital conversion band to be processed in the ADC 50 may be increased.

According to the configurations of the bandpass sampling receivers 100_1 and 100_2 described with reference to FIGS. 2 and 3, the bandpass sampling receivers 100_1 and 100_2 may directly down-convert an analog RF signal in an arbitrary band into a digital baseband signal using the single ADC 50. Moreover, the bandpass sampling receivers 100_1 and 100_2 may remove aliasing through the complex baseband signal extraction unit 60 even though a positive spectrum component shifted from a positive frequency band and a negative spectrum component shifted from a negative frequency band, constituting a digital baseband signal $DR_{12}$, are aliased in a baseband. Therefore, without redesigning a receiver according a frequency band, the complex baseband signal $DR_1$ may be accurately extracted. Moreover, since most circuit configurations of the bandpass sampling receivers 100_1 and 100_2 are digital circuits, their structures are simple and their prices are very low. Accordingly, their hardware complexity may become less and their sizes and manufacturing costs may be reduced.

Figure 4:
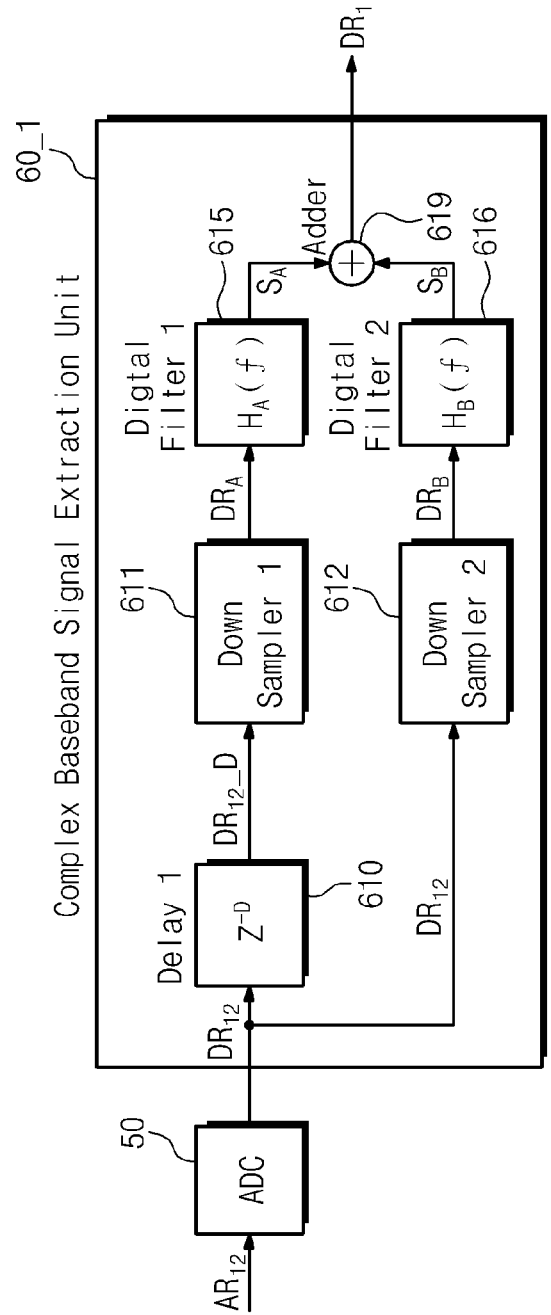
FIG. 4 is an exemplary view illustrating a detailed configuration of a complex baseband signal extraction unit according to a first embodiment of the present invention.

FIG. 4 is an exemplary view illustrating a detailed configuration of a complex baseband signal extraction unit 60_1 according to a first embodiment of the present invention.

Referring to FIG. 4, the complex baseband signal extraction unit 60_1 may include a first delay 610, first and second down sampler 611 and 612, first and second digital filters 615 and 616, and an adder 619.

The first delay 610 delays a digital baseband signal $DR_{12}$ by D-sample. Here, a sample delay value D has an integer greater than 0 and less than a down sample rate N. The D-sample-delayed signal by the first delay 610 is downsampled to allow its sample rate to be 1/N times through the down sampler 611. A first path signal $DR_A$, i.e., an output signal of the first down sampler 611, is provided to the first digital filter 615.

The digital baseband signal $DR_{12}$ generated by the ADC 50 is given to the input of the second down sampler 612 without sample delay to generate a second path signal $DR_B$. The digital baseband signal $DR_{12}$ generated by the ADC 50 is down-sampled to allow its sample rate to be 1/N times through the second down sampler 612. A second path signal $DR_B$ generated by the second down sampler 612 is provided to the second digital filter 616. Here, a sample rate $f'_s$ of a signal generated by the first and second down sampler 611 and 612 becomes $f_s/N$. According to this configuration of the present invention, there is a relative sample delay difference of D/N (not an integer) between the first path signal $DR_A$ and the second path signal $DR_B$ generated by the first and second down sampler 611 and 612

Figure 5:
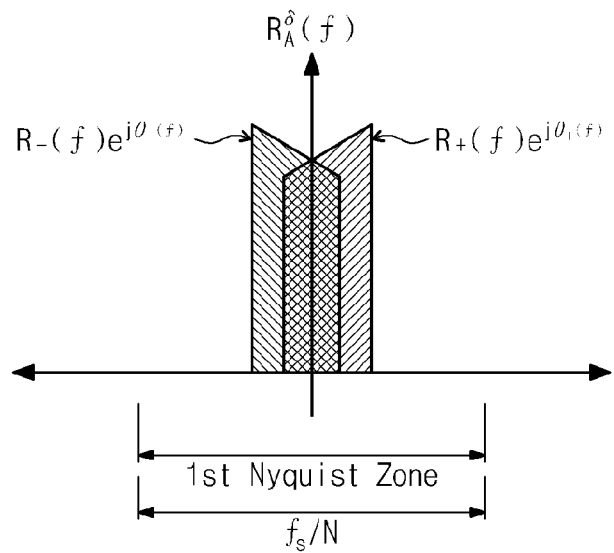
FIG. 5 is an exemplary view illustrating a spectrum of the first path signal outputted from the first down sampler.
Figure 6:
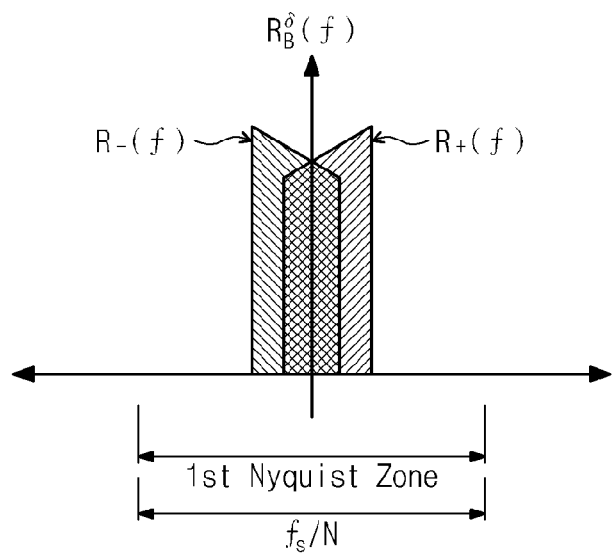
FIG. 6 is an exemplary view illustrating a spectrum of the second path signal outputted from the second down sampler.

FIG. 5 is an exemplary view illustrating a spectrum $R_A^\delta(f)$ of the first path signal $DR_A$ outputted from the first down sampler 611. FIG. 6 is an exemplary view illustrating a spectrum $R_B^\delta(f)$ of the second path signal $DR_B$ outputted from the second down sampler 612.

The spectrums shown in FIGS. 5 and 6 correspond to spectrums in a $1^{st}$ Nyquist zone band. The first path signal $DR_A$ and the second path signal $DR_B$ have the following signal characteristics.

The first path signal $DR_A$ is a down sampled signal after D-sample-delaying an output signal of the ADC 50. On the contrary, the second path signal $DR_B$ is an only down sampled result signal without sample-delaying an output signal of the ADC 50. As a result, the first path signal $DR_A$ is a signal obtained by delaying the second path signal $DR_B$ by $D/f_s(=D/Nf'_s)$. The spectrum of the first path signal $DR_A$ is identical to that of the second path signal $DR_B$, except for the effects of group delay due to a relative time delay difference.

The effects of group delay due to a time delay of the first path signal $DR_A$ is given with $e^{j\theta+(f)}=e^{-j2\pi nD/N}e^{-j2\pi Df/(Nf'_s)}$ with respect to a spectrum component shifted from a positive frequency band and is given with $e^{j\theta-(f)}=e^{j2\pi nD/N}e^{-j2\pi Df/(Nf'_s)}$ with respect to a spectrum component shifted from a negative frequency band.

Here, n has a value of 0, 1, 2, 3, . . . as a frequency band position index of a signal and is determined by a carrier frequency $f_c$ of a signal and a sample rate $f'_s=f_s/N$ at the outputs of the first and second down converters 611 and 612.

$$n = \text{round}\left(\frac{f_c}{f_s/N}\right) \quad \text{[Equation 1]}$$

Here, round( ) represents rounding off to the nearest integer.

Since the first and second digital filters 615 and 616 are designed corresponding to a relative phase difference (i.e., an influence of relative group delay) due to a relative delay time difference between the first path signal $DR_A$ and the second path signal $DR_B$, even if aliasing between positive and negative frequency spectrum components occurs, it is possible to remove the aliasing and completely extract a desired complex baseband signal $DR_1$.

According to embodiments of the present invention, with the first and second digital filters 615 and 616 and the adder 619, a complex baseband signal having a positive frequency spectrum component or a complex baseband signal having a negative frequency spectrum component may be extracted from a signal including a positive frequency spectrum component shifted from a positive frequency band and a negative frequency spectrum component shifted from a negative frequency band.

A design method of the first and second digital filters 615 and 616 according to an embodiment of the present invention is as follows.

Referring to FIGS. 5 and 6, the spectrum $R_A^\delta(f)$ of the first path signal $DR_A$ and the spectrum $R_B^\delta(f)$ B of the second path signal $DR_B$ in the $1^{st}$ Nyquist zone band at the outputs of the first and second down samples 611 and 612 are expressed as the following Equation 2 and Equation 3.

$$R_A^\delta(f) = f'_s \begin{cases} R_-(f)e^{j2\pi nD/N}e^{-j2\pi Df/(Nf'_s)} + \\ R_+(f)e^{-j2\pi nD/N}e^{-j2\pi Df/(Nf'_s)} \end{cases} \quad \text{[Equation 2]}$$

$$R_A^\delta(f) = f'_s\{R_-(f) + R_+(f)\} \quad \text{[Equation 3]}$$

Here, $R_-(f)$ and $R_+(f)$ correspond to a positive and negative spectral replica of the digital baseband signal, respectively.

The spectrum of the first path signal $DR_A$ after the first digital filter 615 and the spectrum of the second path signal $DR_B$ after the second digital filter 616 are expressed as the following Equation 4 and Equation 5.

$$S_A^\delta(f) = H_A(f)f'_s \begin{cases} R_-(f)e^{j2\pi nD/N}e^{-j2\pi Df/(Nf'_s)} + \\ R_+(f)e^{-j2\pi nD/N}e^{-j2\pi Df/(Nf'_s)} \end{cases} \quad \text{[Equation 4]}$$

$$S_B^\delta(f) = H_B(f)f'_s\{R_-(f) + R_+(f)\} \quad \text{[Equation 5]}$$

A filtering result of the first path signal $DR_A$ passing through the first digital filter 615 and a filtering result of the second path signal $DR_B$ passing through the second digital filter 616 are added by the adder 619. In another embodiment, the adder 619 may be replaced with a subtractor to subtract a filtering result of the second digital filter 616 from a filtering result of the first digital filter 615.

The spectrum of an output signal of the adder 619 shown in FIG. 4 is expressed as Equation 6.

$$S(f) = S_A^\delta(f) + S_B^\delta(f) \quad \text{[Equation 6]}$$

$$= R_-(f)f'_s\{H_A(f)e^{j2\pi nD/N}e^{-j2\pi Df/(Nf'_s)} + H_B(f)\} +$$
$$R_+(f)f'_s\{H_A(f)e^{-j2\pi nD/N}e^{-j2\pi Df/(Nf'_s)} + H_B(f)\}$$

When the complex baseband signal extraction unit 60_1 removes a spectrum component shifted from a negative frequency band and obtains only a spectrum component shifted from a positive frequency band, the first and second digital filters 615 and 616 are designed to satisfy the following Equation 7.

$$S(f)=S_A^\delta(f)+S_B^\delta(f)=R_+(f) \quad \text{[Equation 7]}$$

In order for the first and second digital filters 615 and 616 to satisfy Equation 7, they should satisfy simultaneously the two inequality of the following Equation 8 and Equation 9.

$$f'_s\{H_A(f)e^{j2\pi nD/N}e^{-j2\pi Df/(Nf'_s)}+H_B(f)\}=0 \quad \text{[Equation 8]}$$

$$f'_s\{H_A(f)e^{-j2\pi nD/N}e^{-j2\pi Df/(Nf'_s)}+H_B(f)\}=1 \quad \text{[Equation 9]}$$

When the two inequality of the above Equation 8 and Equation 9 are solved, $H_A(f)$ corresponding to a frequency response of the first digital filter 615 is expressed as Equation 10 and $H_B(f)$ corresponding to a frequency response of the second digital filter 616 is expressed as Equation 11.

$$H_A(f) = \begin{cases} \dfrac{e^{j2\pi Df/(Nf'_s)}}{f'_s(e^{-j2\pi nD/N} - e^{j2\pi nD/N})}, & |f| < \dfrac{f'_s}{2} \\ 0, & \text{otherwise} \end{cases} \quad \text{[Equation 10]}$$

$$H_B(f) = \begin{cases} \dfrac{1}{f'_s(1 - e^{-j4\pi nD/N})}, & |f| < \dfrac{f'_s}{2} \\ 0, & \text{otherwise} \end{cases} \quad \text{[Equation 11]}$$

The obtained $H_A(f)$ and $H_B(f)$ may be realized in a digital filter with an operating speed of $f'_s(=f_s/N)$. Additionally, as we have seen from Equation 10 and Equation 11, it should satisfy $(2nD)/N \neq m$ (here, m=integer) and may change $f_s$, D, and N to satisfy $(2nD)/N \neq m$.

Moreover, according to an RF frequency band of a received signal, a coefficient of a digital filter may be recalculated and the digital filter may be reconfigured using the calculated filter coefficient in order to receive signals in all arbitrary frequency bands. A reconfiguration method of a digital filter according to the present invention will be described in more detail with reference to FIG. 15.

Additionally, as we have seen from Equation 11, since $H_B(f)$ corresponding to the second digital filter 616 is not a function of a frequency but a constant and an operating speed of the second digital filter 616 is $f'_s$, an impulse response $H_B(f)$ of the second digital filter 616 has a constant C given by Equation 12 when t=0 and has 0 when t≠0. Therefore, the second digital filter 616 may be replaced with a sample delay and a gain adjustment logic providing a gain by the constant C (refer to FIGS. 12 to 15). Here, an operation of the sample delay compensates for the amount of time consumed from when the first down sampler 611 outputs a down sampling result until the first digital filter 615 outputs a filtering result signal. If the second digital filter 616 is replaced with the sample delay and the gain adjustment logic, circuit configuration becomes simpler and also due to the simplified circuit configuration, the size and manufacturing costs of a receiver will be reduced.

$$C=1/\sqrt{2\{1-\cos(4\pi nD/N)\}} \quad \text{[Equation 12]}$$

Figure 7:
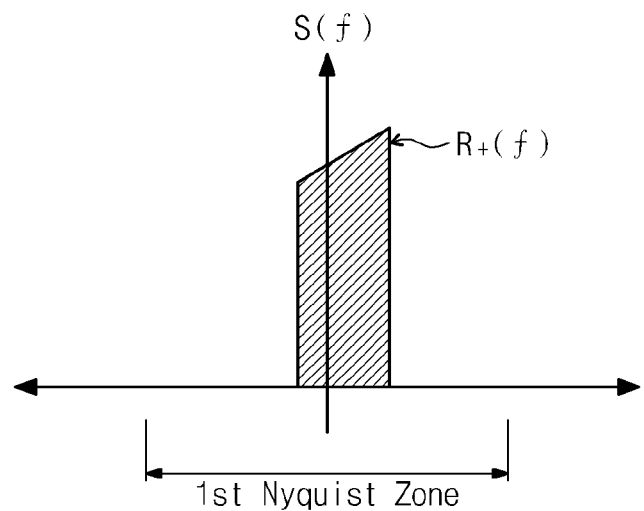
FIG. 7 is an exemplary view illustrating a frequency response of the complex baseband signal outputted from the adder.

FIG. 7 is an exemplary view illustrating a frequency response S(f) of the complex baseband signal $DR_1$ extracted by the adder 619 of FIG. 4.

Referring to FIGS. 4 and 7, since the filtering result $S_A$ of the first path signal passing through the first digital filter 615 and the filtering result $S_B$ of the second path signal passing through the second digital filter 616 are added by the adder 619, the spectrum component $R_-(f)$ shifted from a negative frequency band is removed and only the spectrum component $R_+(f)$ shifted from a positive frequency band remains. Therefore, aliasing is removed and a desired complex baseband signal $DR_1$ is extracted.

The center frequency of the complex baseband signal $DR_1$ extracted by the adder 619 may not have 0 as shown in FIG. 7. For example, the center frequency of the complex baseband signal $DR_1$ may be less or greater than 0. In this case, the center frequency of the complex baseband signal $DR_1$ may be up/down-converted by the digital up/down converter 80 to be adjusted to 0. The digital up/down conversion operation by the digital up/down converter 80 is expressed as Equation 13.

$$r(t)=s(t)\exp(-j2\pi f_{if}t) \quad \text{[Equation 13]}$$

Here, s(t) represents the complex baseband signal $DR_1$ at the output of the adder 619 and $f_{if}$ represents the intermediate frequency of the complex baseband signal $DR_1$ outputted through the adder 619. This will be obtained as Equation 14.

$$f_{if}=f_c-nf'_s \quad \text{[Equation 14]}$$

According to digital up/down conversion operations of the digital up/down converter 80 expressed as Equation 13, the intermediate frequency of the complex baseband signal $DR_1$ at the output of the adder 619 may be adjusted to 0. The complex baseband signal $DR_1'$ at the output of digital up/down converter 80 is given to input of the DSP 90. The DSP 90 performs baseband signal processing on the inputted complex baseband signal $DR_1'$. The baseband signal processing of the DSP 90 may include a demodulation operation.

Figure 16:
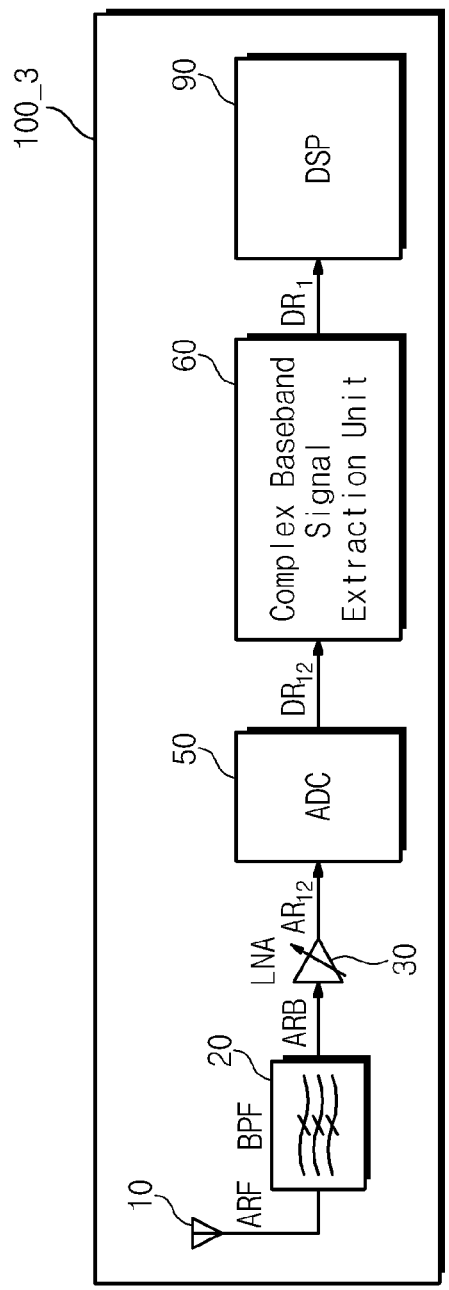
FIGS. 16 and 17 are schematic views illustrating full configurations of bandpass sampling receivers according to another embodiment of the present invention.
Figure 17:
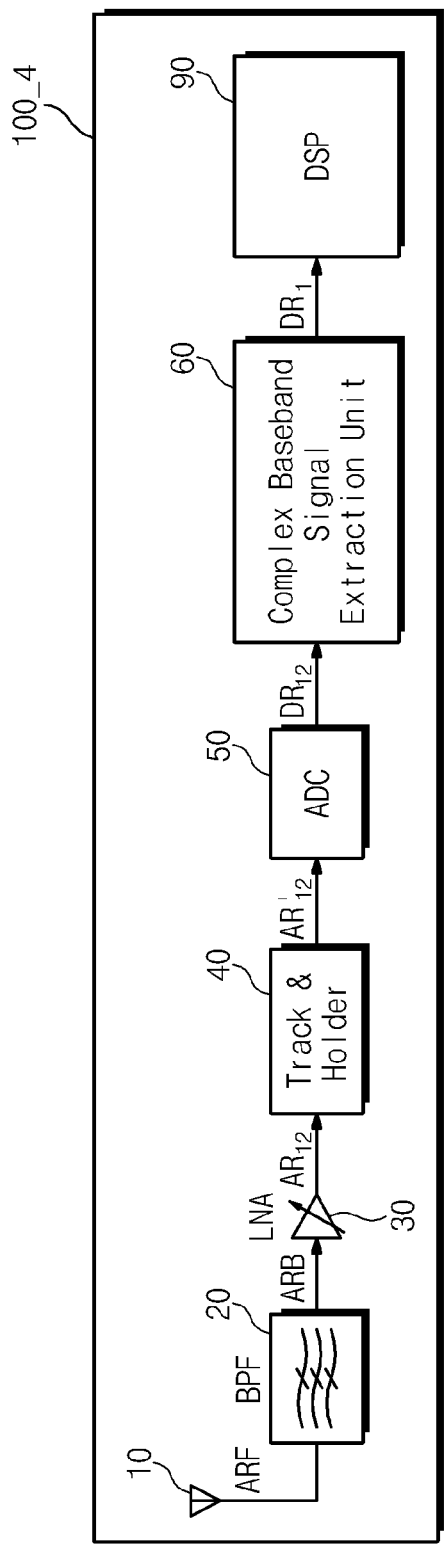

If the center frequency of the complex baseband signal $DR_1$ at the output of the adder 619 is 0 (i.e., the center frequency of an analog signal is integer times of a sample rate), a configuration of the digital up/down converter 80 may be omitted in the bandpass sampling receiver according to an embodiment of the present invention (refer to FIGS. 16 and 17).

The configuration of the complex baseband signal extraction units 60_1 described above may not be limited to a specific form and may have various changes and modifications. A modification example of the complex baseband signal extraction units 60_1 according to an embodiment of the present invention is as follows.

Figure 8:
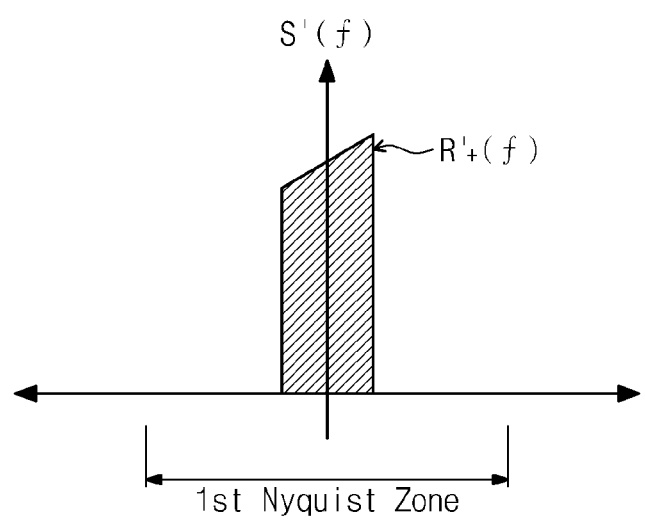
FIG. 8 is an exemplary view illustrating a frequency response of a up/down converted first complex baseband signal outputted from the digital up/down converter.

FIG. 8 is an exemplary view illustrating a frequency response S'(f) of an complex baseband signal $DR_1'$ after digital up/down conversion by the digital up/down converter 80 of FIG. 3. Referring to FIG. 8, the complex baseband signal $DR_1$ extracted by the adder 619 may be up/down-converted through the digital up/down converter 80. That is, the center frequency of the complex baseband signal $DR_1$ extracted by the adder 619 may be up/down-converted by the digital up/down converter 80 to be adjusted to 0.

Figure 9:
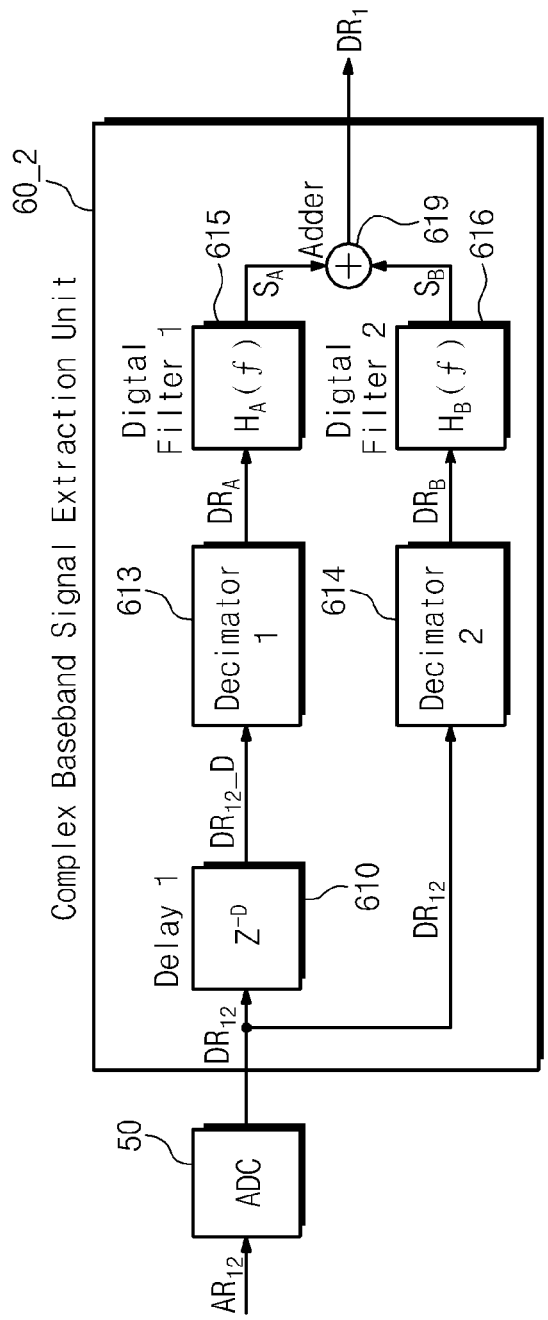
FIG. 9 is an exemplary view illustrating a detailed configuration of the complex baseband signal extraction units according to a second embodiment of the present invention.

FIG. 9 is an exemplary view illustrating a detailed configuration of the complex baseband signal extraction units 60_2 according to a second embodiment of the present invention.

Referring to FIG. 9, the first down sampler 611 of FIG. 4 may be replaced with a first decimator 613 and the second down sampler 612 of FIG. 4 may be replaced with a second decimator 613. Each of the first and second decimators 613 and 614 may include a pre-digital filter and a down sampler and a sample rate of an output signal may be adjusted to be 1/N times of an input signal (N is an integer greater than 1). These pre-filtering and down sampling operations of the first and second decimators 613 and 614 may correspond to the down sampling operations of the first and second down sampler 611 and 612.

Except for the first and second decimators 613 and 614, the configuration of the complex baseband signal extraction unit 60_2 of FIG. 9 is substantially identical to that of the complex baseband signal extraction units 60_1 of FIG. 4. Accordingly, like reference numerals refer to like elements and overlapping description will be omitted.

Figure 10:
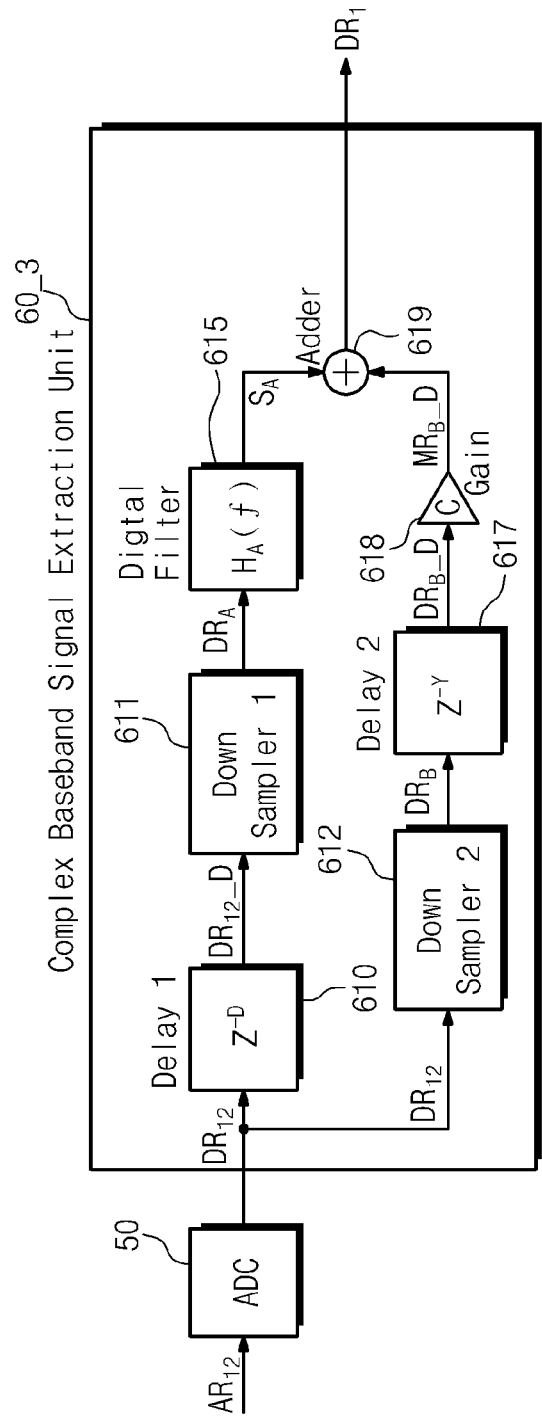
FIGS. 10 and 11 are exemplary views illustrating detailed configurations of complex baseband signal extraction units according to third and fourth embodiments of the present invention.
Figure 11:
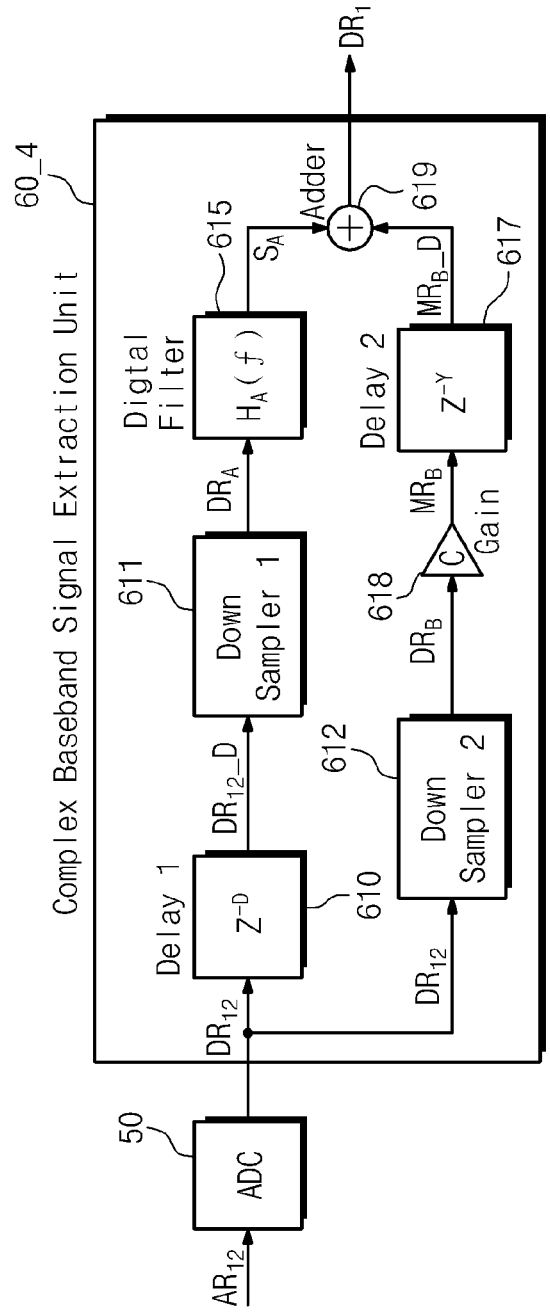

FIGS. 10 and 11 are exemplary views illustrating detailed configurations of complex baseband signal extraction units 60_3 and 60_4 according to third and fourth embodiments of the present invention.

Referring to FIGS. 10 and 11, the second digital filter 616 of FIG. 4 may be replaced with a second delay 617 and a gain adjustment logic 618 providing a predetermined gain. The second delay 617 may be configured to Y-sample-delay the second path signal $DR_B$. The sample delay operation of the second delay compensates for the amount of time consumed from when the first down sampler 611 outputs a down sampling result until the first digital filter 615 outputs a filtering result signal. In this case, the amount of time consumed until the first digital filter 615 outputs a filtering result signal may actually correspond to the amount of time consumed during a filtering operation of the first digital filter 615. Accordingly, a sample delay value Y of the second delay filter 615 may be determined according to the amount of time consumed during the filtering operation of the first digital filter 615.

For example, when the first digital filter 615 of the complex baseband signal extraction units 60_1 is realized with a Finite Impulse Response (FIR) filter with a length L, since a time delay due to a FIR filtering operation is given by [L/2], a sample delay value may be configured to be [L/2]. Here, [X] represents the largest number among integers less than X. The gain adjustment logic 618 applies a gain by a constant C to the sample delay result $DR_B\_D$ of the second delay 617. An output signal $MR_B\_D$ of the gain adjustment logic 618 is provided to the adder 619. Since the filtering result $S_A$ of the first digital filter 615 and the output signal $MR_B\_D$ of the gain adjustment logic 618 are added by the adder 619, the spectrum component $R_-(f)$ shifted from a negative frequency band is removed from an output of the complex baseband signal extraction unit 60_3 and only the spectrum component $R_+(f)$ shifted from a positive frequency band remains.

A connection order of the second delay 617 and the gain adjustment logic 618 is not limited to a specific form and, as shown in FIGS. 10 and 11, may be interchangeable.

If the complex baseband signal extraction units 60_3 and 60_4 may include the second delay 617 and the gain adjustment logic 618 instead of the second digital filter 616, its circuit configuration becomes simpler and also due to the simplified circuit configuration, the size and manufacturing costs of a receiver will be reduced.

The configurations of the complex baseband signal extraction units 60_3 and 60_4 of FIGS. 10 and 11 except for the second delay 617 and the gain adjustment logic 618 are substantially identical to that of the complex baseband signal extraction units 60_1 of FIG. 4. Accordingly, like reference numerals refer to like elements and overlapping description will be omitted.

Figure 12:
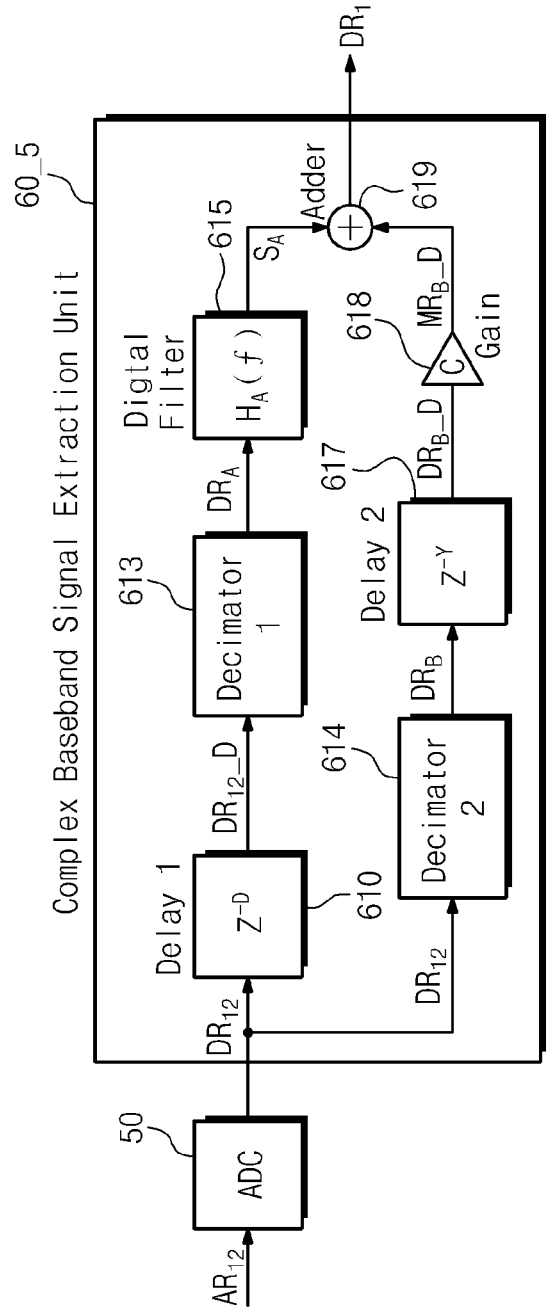
FIGS. 12 and 13 are exemplary views illustrating detailed configurations of complex baseband signal extraction units according to fifth and sixth embodiments of the present invention.
Figure 13:
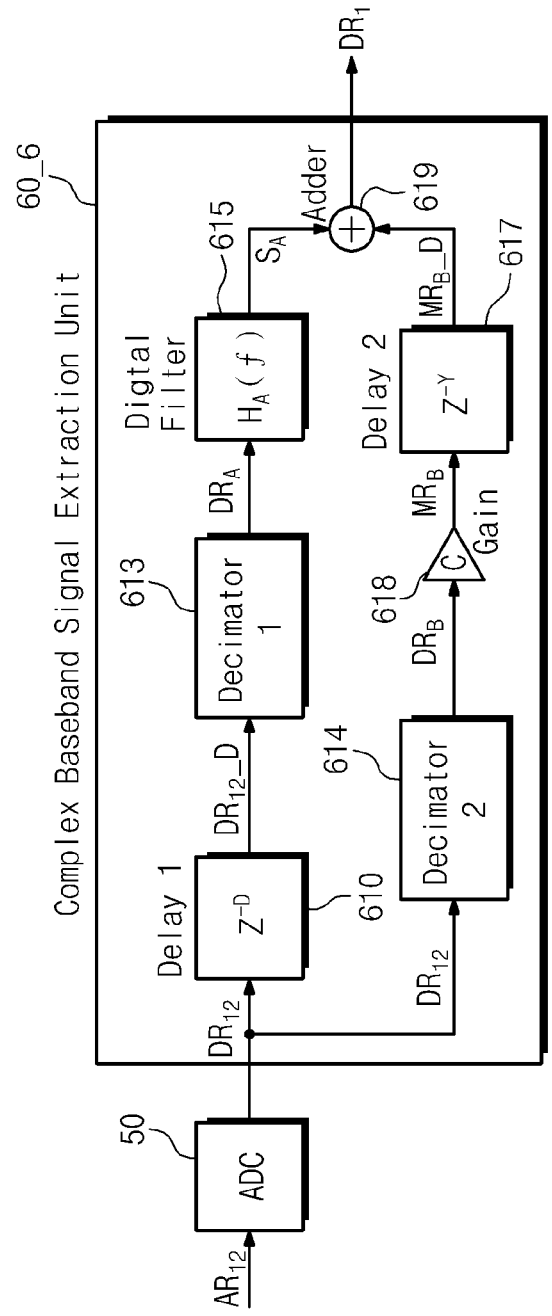

FIGS. 12 and 13 are exemplary views illustrating detailed configurations of complex baseband signal extraction units 60_5 and 60_6 according to fifth and sixth embodiments of the present invention.

Referring to FIGS. 12 and 13, the first down sampler 611 of FIG. 4 may be replaced with a first decimator 613 and the second down sampler 612 of FIG. 4 may be replaced with a second decimator 614. Each of the first and second decimators 613 and 614 may include a pre-digital filter and a down sampler and a sample rate of an output signal may be adjusted to be 1/N times of an input signal. Such pre-filtering and down sampling operations of the first and second decimators 613 and 614 may finally correspond to the down sampling operations of the first and second down samplers 611 and 612.

Moreover, the second digital filter 616 of FIG. 4 may be replaced with the second delay 617 and the gain adjustment logic 618 providing a gain by a constant C.

A connection order of the second delay 617 and the gain adjustment logic 618 is not limited to a specific form and, as shown in FIGS. 12 and 13, may be interchangeable.

The configurations of the complex baseband signal extraction units 60_5 and 60_6 of FIGS. 12 and 13 except for the first and second decimators 613 and 614, the second delay 617, and the gain adjustment logic 618 are substantially identical to that of the complex baseband signal extraction units 60_1 of FIG. 4. Accordingly, like reference numerals refer to like elements and overlapping description will be omitted.

The above-described embodiments of the bandpass sampling receiver relate to the case that the complex baseband signal extraction units 60 and 60_1 to 60_6 use the adder 619 to extract the complex baseband signal $DR_1$. As another embodiment, the complex baseband signal extraction units 60 and 60_1 to 60_6 use the subtractor instead of the adder 619 to extract the complex baseband signal $DR_1$. According to another embodiment using the subtractor, in order for the complex baseband signal extraction units 60 and 60_1 to 60_6 to extract the complex baseband signal $DR_1$, the first digital filter 615 and the second digital filter 616 may be designed to satisfy the following Equation 15.

$$S(f) = S_A^\delta(f) - S_B^\delta(f) = R_-(f) \qquad \text{[Equation 15]}$$

Since the detailed design methods of the first digital filter 615 and the second digital filter 616 according to this embodiment are identical to the filter design method given with Equation 2 to Equation 12, overlapping descriptions are omitted.

As another embodiment, the complex baseband signal extraction units 60 and 60_1 to 60_6 may remove a positive frequency spectrum component shifted from a positive frequency band and may extract the complex baseband signal $DR_1$ having a negative frequency spectrum component shifted from a negative frequency band. According to this embodiment, in order for the complex baseband signal extraction units 60 and 60_1 to 60_6 to extract the complex baseband signal $DR_1$, the first digital filter 615 and the second digital filter 616 may be designed to satisfy the following Equation 16 and Equation 17.

$$S(f)=S_A{}^\delta(f)+S_B{}^\delta(f)=R_-(f) \quad \text{[Equation 16]}$$

$$S(f)=S_A{}^\delta(f)-S_B{}^\delta(f)=R_-(f) \quad \text{[Equation 17]}$$

Here, Equation 16 corresponds to the case that the complex baseband signal extraction units 60 and 60_1 to 60_6 use the adder 619 to extract a complex baseband signal and Equation 17 corresponds to the case that the complex baseband signal extraction units 60 and 60_1 to 60_6 use the subtractor to extract a complex baseband signal.

Since the detailed design methods of the first digital filter 615 and the second digital filter 616 according to this embodiment are identical to the filter design method given with Equation 2 to Equation 12, overlapping descriptions are omitted.

Figure 14:
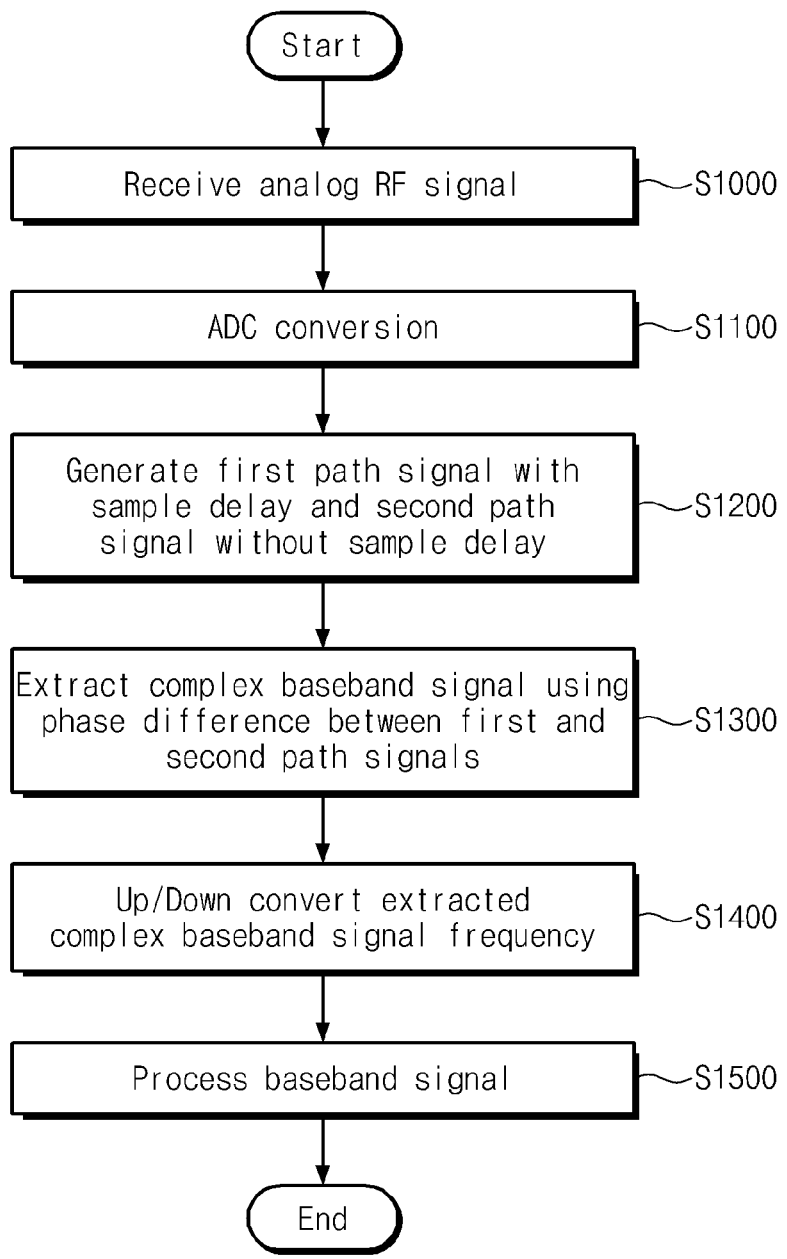
FIG. 14 is an exemplary flowchart illustrating a complex baseband signal extracting method of a bandpass sampling receiver according to an embodiment of the present invention.

FIG. 14 is an exemplary flowchart illustrating a complex baseband signal extracting method of a bandpass sampling receiver according to an embodiment of the present invention. The complex baseband signal extracting method of FIG. 14 may be applied to all the bandpass sampling receivers 100, 100_1, and 100_2 including the above-described complex baseband signal extraction units 60 and 60_1 to 60_6.

Referring to FIG. 14, the bandpass sampling receivers 100, 100_1, and 100_2 receive an analog RF signal ARF through the antenna 10 in operation 1000. The analog RF signal ARF received through the antenna 10 may be converted into an analog RF signal $AR_{12}$ having a predetermined bandwidth B and a predetermined carrier frequency $f_c$ through the BPF 20 and the LNA 30. The analog RF signal $AR_{12}$ may be converted into a digital baseband signal $DR_{12}$ through the ADC 50 in operation S1100. The digital baseband signal $DR_{12}$ may include the sum of a spectrum component shifted from a positive frequency band and a spectrum component shifted from a negative frequency band.

The complex baseband signal extraction units 60 and 60_1 to 60_6 generate a first path signal $DR_A$ with a sample delay and a second path signal $DR_B$ without a sample delay from the digital baseband signal $DR_{12}$ converted by the ADC 50 in operation S1200.

The first path signal $DR_A$ is a down sampled signal after D-sample-delaying an output of the ADC 50 and the second path signal $DR_B$ is a down sampled result signal without sample-delaying an output of the ADC 50. The first path signal $DR_A$ and the second path signal $DR_B$ are down-sampled to allow their sample rates to be 1/N times through the first and second down samplers 611 and 612. A sample rate $f_s$ of a down sampling result outputted from the first and second down sampler 611 and 612 becomes $f_s/N$. In an exemplary embodiment, the first and second down sampler 611 and 612 may be replace with the first and second decimators 613 and 614. Each of the first and second decimators 613 and 614 may include a pre-digital filter and a down sampler and a sample rate of an output signal may be adjusted to be 1/N times of an input signal (N is an integer greater than 1). These pre-filtering and down sampling operations of the first and second decimators 613 and 614 may correspond to the down sampling operations of the first and second down sampler 611 and 612.

Then, the complex baseband signal extraction units 60 and 60_1 to 60_6 may extract a complex baseband signal $DR_1$ using a relative phase difference (i.e., corresponding to a sample delay difference of D/N) caused by a relative sample delay difference between the first path signal $DR_A$ and the second path signal $DR_B$ in operation S1300.

The first digital filter 615, the second digital filter 616 (or the second delay 617 and the gain adjustment logic 618), and the adder 619 in the complex baseband signal extraction units 60 and 60_1 to 60_6 may be used extract the first complex baseband signal $DR_1$. Then, the first digital filter 615 and the second digital filter 616 may be realized with a FIR filter form and the second digital filter 616 may be replaced with the second delay 617 and the gain adjustment logic 618 (refer to FIGS. 10 to 13). Since the filtering result $S_A$ of the first digital filter 615 and the filtering result $S_B$ of the second digital filter 616 (in FIGS. 10 to 13, an output of the gain adjustment logic 618 instead of the filtering result $S_B$ of the second digital filter 616) are added by the adder 619, the spectrum component $R_-(f)$ shifted from a negative frequency band is removed and only the spectrum component $R_+(f)$ shifted from a positive frequency band remains.

The complex baseband signal $DR_1$ extracted in operation S1300 are up/down-converted through the digital up/down converter 80, so that the center frequency of the complex baseband signal $DR_1$ may be shifted to 0 in operation S1400. Then, an output signal of the digital up/down converter 80 is provided to the DSP 90 and then baseband signal processing (e.g., a demodulation operation) is performed in operation S1500.

According to the above-described complex baseband signal extracting method of a bandpass sampling receiver, even when a positive frequency spectrum component and a negative frequency spectrum component are aliased in a baseband, a complex baseband signal is extracted completely by removing aliasing influence. That is, even only with the single ADC 50, a positive frequency spectrum component shifted from a positive frequency band and a negative frequency spectrum component shifted from a negative frequency band are extracted completely. Accordingly, compared to a typical bandpass sampling receiver with a specific sample rate, a more flexible sample rate is selected and all frequency bands and signal bandwidths are receptacle.

Additionally, the complex baseband signal extraction units 60 and 60_1 to 60_6 may include only one ADC 50 and all the components for extracting a complex baseband signal may include digital circuits. Therefore, compared to a typical bandpass sampling receiver, hardware complexity becomes less.

Figure 15:
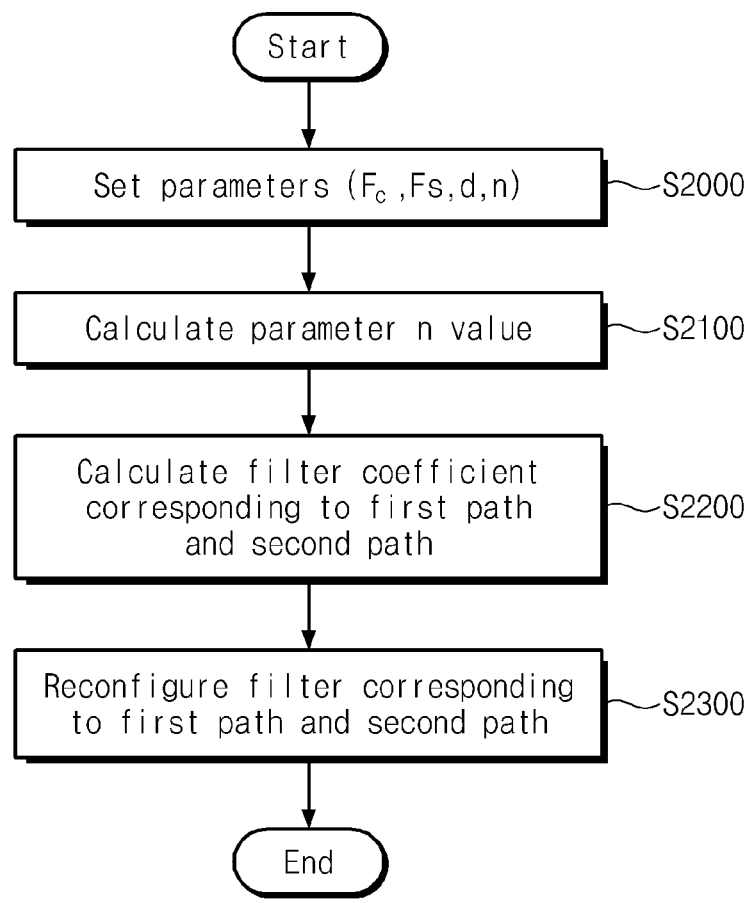
FIG. 15 is an exemplary flowchart illustrating a reconfiguration method of the digital filters for complex baseband signal extraction in a bandpass sampling receiver according to an embodiment of the present invention.

FIG. 15 is an exemplary flowchart illustrating a reconfiguration method of the digital filters 615 and 616 for complex baseband signal extraction in a bandpass sampling receiver according to an embodiment of the present invention. The reconfiguration method of the digital filters 615 and 616 may be applied to all the complex baseband signal extraction units 60 and 60_1 to 60_6 and a bandpass sampling receiver including the same.

The bandpass sampling receiver is not limited to a signal of a specific frequency band and may receive an RF signal in an arbitrary frequency band. The filter function of the digital filters 615 and 616 given with Equation 7 to Equation 11 is determined according to a frequency band (or a carrier frequency) of an analog RF signal. Accordingly, the digital filters 615 and 616 may be flexibly reconfigured for the bandpass sampling receiver to receive all arbitrary frequency band signals.

Moreover, in relation to a filter coefficient of the digital filters 615 and 616, as at least one of the sample rate $f_s$ of the ADC 50, the frequency band position index (n, n=0, 1, 2, 3, ...) of the analog RF signal $AR_{12}$, the sample delay value D of the first delay 610, and the down sampling rate N of the first down sampler 611 and the second down sampler 612 is changed, the digital filter coefficient of each of the digital filters 615 and 616 is recalculated. On the basis of the recalculated digital filter coefficient of the digital filters 615 and 616, the digital filters 615 and 616 may be flexibly reconfigured.

Referring to FIG. 15, the reconfiguration method of the first and second digital filters 615 and 616 may set the carrier frequency $f_c$, the sample rate $f_s$, the sample delay value D of the first delay 610, and the down sampling rate N of the first down sampler 611 and the second down sampler 612, as filtering parameters in operation S2000.

Herein, the carrier frequency $f_c$ represents a carrier frequency of the analog RF signal $AR_{12}$ and the sample rate $f_s$ represents a sample rate when the analog RF signal $AR_{12}$ is converted into the digital baseband signal $DR_{12}$ through the ADC 50.

The complex baseband signal extraction unit 60 extracts the complex baseband signal $DR_2$ including a positive frequency spectrum component shifted from a positive frequency band or a negative frequency spectrum component shifted from a negative frequency band.

In order to extract the complex baseband signal $DR_1$ or $DR_2$, the complex baseband signal extraction unit 60 generates a first path signal $DR_A$ with a sample delay and a second path signal $DR_B$ without a sample delay outputted from the ADC 50.

In more detail, the digital baseband signal $DR_{12}$ outputted from the ADC 50 is D-sample-delayed through the first delay 610 and thus is generated as a delay signal $DR_{12\_}D$. The delay signal $DR_{12\_}D$ generated from the first delay 610 is down-sampled for its sample rate to be 1/N times through the first down sampler 611 and then is generated as a first path signal $DR_A$. The first path signal $DR_A$ generated from the first down sampler 611 is provided to the first digital filter 615. Here, N is an integer greater than 1 and the sample delay D may have an integer value greater than 0 and less than the down sample rate N.

The digital baseband signal $DR_{12}$ not passing through the first delayer 610 is down-sampled to allow for its sample rate to be 1/N times through the second down sampler 612 and then is generated as a second path signal $DR_B$. The second path signal $DR_B$ is provided to the second digital filter 616 and the second signal extraction unit 62. Here, the sample rate $f'_s$ of the first path signal $DR_A$ and the second path signal $DR_B$ is $f_s/N$. According to the configuration, there is a relative sample delay difference (i.e., a relative time delay difference of $D/(Nf'_s)$) between the first path signal $DR_A$ and the second path signal $DR_B$.

Continuously, an n value is calculated as a parameter applied to the first and second digital filters 615 and 616 in operation S2100.

Here, n has a value of 0, 1, 2, 3, . . . , as a frequency band position index of the analog RF signal $AR_{12}$. n is calculated based on the above Equation 1.

After parameters are set and calculated, coefficients of the first and second digital filters 615 and 616 are calculated in operation S2200 in consideration of the influence of relative group delay between the parameters and the first and second path signals $DR_A$ and $DR_B$. The coefficient of the first and second digital filters 615 and 616 may be calculated using the filter function shown in the above Equation 10 and Equation 11.

After the filter coefficient is calculated, the first and second digital filters 615 and 616 are reconfigured using the calculated filter coefficient in operation S2300.

FIGS. 16 and 17 are schematic views illustrating full configurations of bandpass sampling receivers 100_3 and 100_4 according to another embodiment of the present invention. When the center frequency of a complex baseband signal extracted from the complex baseband signal extraction unit 60 is 0, its configuration is shown in FIGS. 16 and 17.

The bandpass sampling receiver 100_3 of FIG. 16 has substantially the same configuration as the band pass sampling receiver 100_1 of FIG. 2, except that the digital up/down converter 80 is not provided. Moreover, the bandpass sampling receiver 100_4 of FIG. 17 has substantially the same configuration as the band pass sampling receiver 100_2 of FIG. 3, except that the digital up/down converter 80 is not provided. Furthermore, the bandpass sampling receiver 100_3 of FIG. 16 has substantially the same configuration as the band pass sampling receiver 100_4 of FIG. 17, except that the track and holder 40 is not provided. Additionally, referring to FIGS. 16 and 17, the detailed configuration of the complex baseband signal extraction unit 60 may be configured identical to those of the complex baseband signal extraction units 60_1 to 60_6 of FIG. 13 according to the first to sixth embodiments of the present invention. Therefore, like reference numerals refer to like elements and overlapping descriptions will be omitted.

When the complex baseband signal extraction unit 60 generates a complex baseband signal having the center frequency of 0, the digital up/down converter 80 of FIGS. 2 and 3 for shifting the center frequency of a complex baseband signal to 0 may not be required in the bandpass sampling receivers 100_3 and 100_4. If the digital up/down converter 80 is not required, the sizes and manufacturing costs of the bandpass sampling receivers 100_3 and 100_4 may be further reduced.

Figure 18:
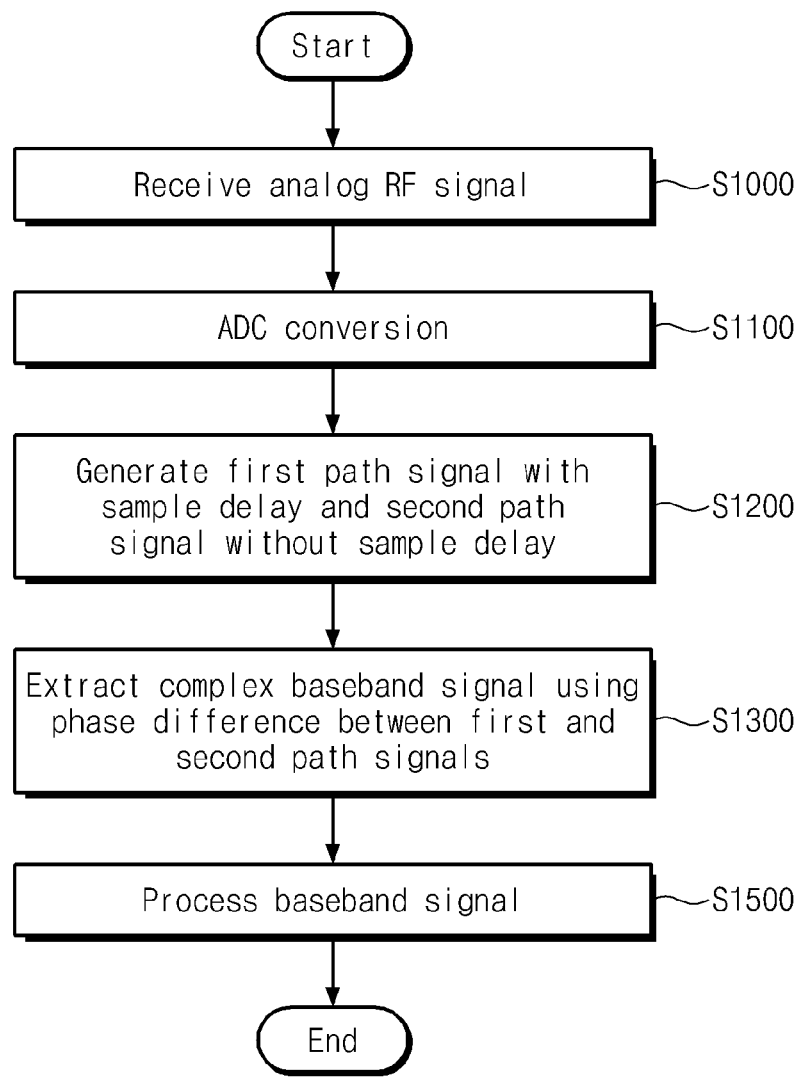
FIG. 18 is an exemplary flowchart illustrating a complex baseband signal extracting method according to another embodiment of the present invention.

FIG. 18 is an exemplary flowchart illustrating a complex baseband signal extracting method according to another embodiment of the present invention. The complex baseband signal extracting method of FIG. 18 may be applied to all the bandpass sampling receivers 100_3 and 100_4 including the above-described complex baseband signal extraction units 60 and 60_1 to 60_6 according to another embodiment.

The complex baseband signal extracting method of FIG. 18 is substantially identical to that of FIG. 14, except that no up/down conversion operation is performed on the extracted complex baseband signal (i.e., operation S1400 of FIG. 14 is omitted). That is, when the complex baseband signal extraction unit 60 generates a complex baseband signal having the center frequency of 0, the digital up/down converter 80 of FIGS. 2 and 3 for shifting the center frequency of a complex baseband signal to 0 may not be required in the bandpass sampling receivers 100_3 and 100_4.

Therefore, like reference numerals refer to like elements and overlapping descriptions will be omitted.

Figure 19:
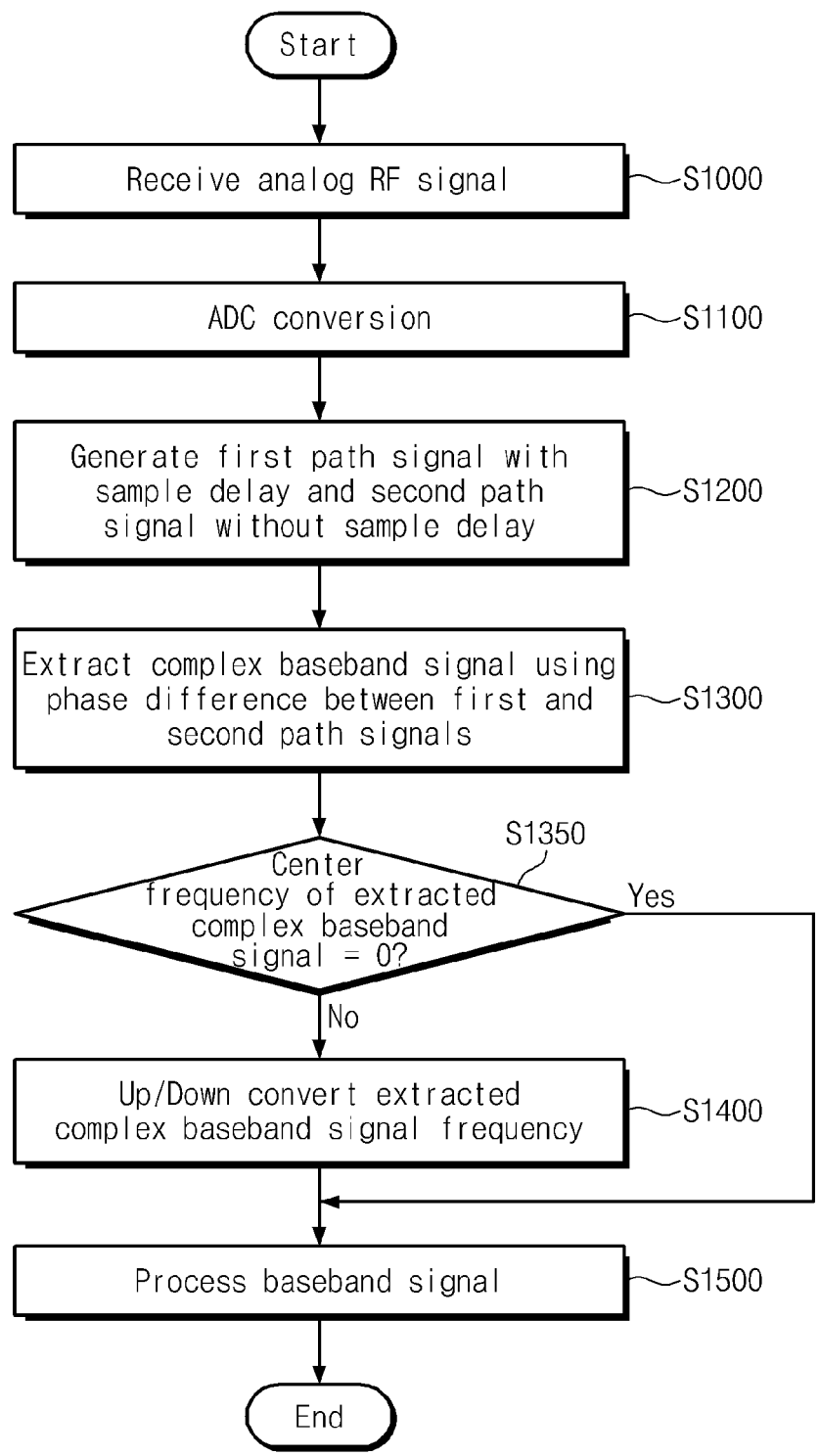
FIG. 19 is an exemplary flowchart illustrating a complex baseband signal extracting method according to another embodiment of the present invention.

FIG. 19 is an exemplary flowchart illustrating a complex baseband signal extracting method according to another embodiment of the present invention. The complex baseband signal extracting method of FIG. 19 may be selectively applied to the bandpass sampling receivers 100_1 and 100_4 including the above-described complex baseband signal extraction units 60 and 60_1 to 60_6 according to another embodiment.

The complex baseband signal extracting method of FIG. 19 is substantially identical to those of FIGS. 14 and 18, except for operation S1350 for determining whether the center frequency of an extracted complex baseband signal is 0 and operations S1400 and S1500 for selectively performing up/down conversion on a complex baseband signal on the basis of a determination result of operation S1350. Therefore, like reference numerals refer to like elements and overlapping descriptions will be omitted.

As described above, the bandpass sampling receivers 100_1 to 100_4 of the present invention may include complex baseband signal extraction units 60 and 60_1 to 60_6 for removing aliasing and accurately extracting a desired complex baseband signal $DR_1$ even if complex signals shifted from positive and negative frequency bands are aliased in a baseband.

According to the configuration of the complex baseband signal extraction units 60 and 60_1 to 60_6, even only with a single ADC, a complex signal shifted from a positive frequency band and/or a negative frequency band may be completely extracted with no influence of a specific sample rate. Therefore, compared to a typical bandpass sampling receiver with a specific sample rate, a more flexible sample rate is selected and all frequency bands and signal bandwidths are receptacle. Moreover, compared to a typical bandpass sampling receiver, hardware complexity may become less so that the sizes and manufacturing costs of a receiver may be reduced.

According to embodiments of the present invention, when a complex baseband signal of a baseband is extracted from a received analog RF signal, one ADC and a complex baseband signal extractor whose all components include digital circuits may be used. Thus, hardware complexity becomes less so that the size and manufacturing cost of a receiver is reduced.

Furthermore, according to embodiments of the present invention, aliasing in a baseband may be effectively removed. Accordingly, accurate reception of all frequency bands and signal bandwidths becomes possible using a single ADC. Furthermore, although only the single ADC is used, a flexible sample rate becomes applicable.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A bandpass sampling receiver comprising:
an analog-digital converter converting an analog wireless signal into a digital signal; and
a complex baseband signal extraction unit generating a first path signal and a second path signal from the digital signal and extracting a complex signal using a relative sample delay difference between the first and second path signals,
wherein the first path signal is a signal obtained by applying a sample delay operation and a down sampling operation to the digital signal and the second path signal is a signal obtained by applying the down sampling operation to the digital signal, wherein the complex baseband signal extraction unit comprises:
a first delay generating a sample-delayed version of the digital signal from the analog-to-digital converter;
a first down sampler generating the first path signal by down-sampling a delay result of the first delay;
a second down sampler generating the second path signal by down-sampling the digital signal from the analog-digital converter;
a first digital filter filtering the first path signal;
a second digital filter filtering the second path signal; and
an adder extracting the complex signal by adding a filtering result of the first digital filter and a filtering result of the second digital filter.

2. The bandpass sampling receiver of claim 1, wherein a relative phase difference due to the relative sample delay difference between the first path signal and the second path signal is determined by at least one of a sampling rate of the analog-digital converter, a delay value of the first delay, and a down sampling rate of the first and second down samplers.

3. The bandpass sampling receiver of claim 1, wherein digital filter coefficients of each of the first digital filter and the second digital filter are determined by at least one of a carrier frequency of the analog signal, a frequency band position index of the analog signal, a sampling rate of the analog-digital converter, a sample delay value of the first delay, and a down sampling rate of the first and second down samplers.

4. The bandpass sampling receiver of claim 1, wherein digital filter coefficients of each of the first digital filter and the second digital filter are recalculated as at least one of a carrier frequency of the analog signal, a frequency band position index of the analog signal, a sampling rate of the analog-digital converter, a sample delay value of the first delay, and a down sampling rate of the first and second down samplers is changed and on the basis of the recalculated digital filter coefficients, each of the first digital filter and the second digital filter is reconfigured.

5. The bandpass sampling receiver of claim 1, wherein the first digital filter and the second digital filter are determined to satisfy at least one of $S(f)=S_A^\delta(f)+S_B^\delta(f)=R_+(f)$, $S(f)=S_A^\delta(f)-S_B^\delta(f)=R_+(f)$, $S(f)=S_A^\delta(f)+S_B^\delta(f)=R_-(f)$, and $S(f)=S_A^\delta(f)-S_B^\delta(f)=R_-(f)$, where $S(f)$ represents a spectrum of an output signal of the adder, $S_A^\delta(f)$ represents a spectrum of the first digital filter output signal, $S_B^{67}(f)$ represents a spectrum of the second digital filter output signal, $R_-(f)$ represents a negative frequency spectrum of the digital baseband signal, and $R_+(f)$ represents a positive frequency spectrum of the digital baseband signal.

6. The bandpass sampling receiver of claim 1, wherein an operating speed of the first digital filter and the second digital filter are determined according to a sampling rate of the analog-digital converter and a down sampling rate of the first and second down samplers.

7. A bandpass sampling receiver comprising:
an analog-digital converter converting an analog wireless signal into a digital signal; and
a complex baseband signal extraction unit generating a first path signal and a second path signal from the digital signal and extracting a complex signal using a relative sample delay difference between the first and second path signals,
wherein the first path signal is a signal obtained by applying a sample delay operation and a decimating operation to the digital signal and the second path signal is a signal obtained by applying the decimating operation to the digital signal, and
wherein at least one value of a sampling rate of the analog-digital converter, the relative sample delay difference D, and a down sampling rate N of the decimation operation is controlled to satisfy $(2nD)/N \ne m$, where n is a frequency band position index of the analog signal and m is an integer.

8. A bandpass sampling receiver, comprising:
an analog-digital converter converting an analog wireless signal into a digital signal; and
a complex baseband signal extraction unit generating a first path signal and a second path signal from the digital signal and extracting a complex signal using a relative sample delay difference between the first and second path signals,
wherein the first path signal is a signal obtained by applying a sample delay operation and a decimating operation to the digital signal and the second path signal is a signal obtained by applying the decimating operation to the digital signal, wherein the complex signal extraction unit comprises:
a first delay generating the sample-delayed version of the digital signal from the analog-to-digital converter;
a first decimator generating the first path signal by down-sampling a delay result of the first delay;
a second decimator generating the second path signal by down-sampling the digital signal from the analog-digital converter;
a first digital filter filtering the first path signal;
a second digital filter filtering the second path signal; and
an adder extracting the complex signal by adding a filtering result of the first digital filter and a filtering result of the second digital filter.

9. The bandpass sampling receiver of claim 8, wherein the second digital filter comprises a sample delay and a gain adjustment logic.

10. The bandpass sampling receiver of claim 9, wherein a sample delay value of the sample delay is determined according to required time of filtering operation of the first digital filter.

11. A bandpass sampling receiver comprising:
an analog-digital converter converting an analog wireless signal into a digital signal; and
a complex baseband signal extraction unit generating a first path signal and a second path signal from the digital signal and extracting a complex signal using a relative sample delay difference between the first and second path signals,
wherein the first path signal is a signal obtained by applying sample delay operation and down sampling operation to the digital signal and the second path signal is a signal obtained by applying down sampling operation to the digital signal, and
wherein at least one value of a sampling rate of the analog-digital converter, the relative sample delay difference D, and a down sampling rate N of the decimation operation is controlled to satisfy $(2nD)/N \neq m$, where n is a frequency band position index of the analog signal and m is an integer.

12. The bandpass sampling receiver of claim 11, wherein the complex signal extraction unit comprises:
a first delay unit to obtain the first path signal by applying the sample delay operation to the digital signal;
a first down sampler unit to obtain the first path signal by applying the down sampling operation to the sample-delayed digital signal; and
a second down sampler unit to obtain the second path signal by applying the down sampling operation to the digital signal.

13. The bandpass sampling receiver of claim 11, wherein the complex signal extraction unit comprises:
a first down sampler unit to obtain the first path signal by applying the down sampling operation to the digital signal;
a first delay unit to obtain the first path signal by applying the sample delay operation to the down-sampled digital signal; and
a second down sampler unit to obtain the second path signal by applying the down sampling operation to the digital signal.

* * * * *